United States Patent [19]
Wright et al.

[11] Patent Number: 5,313,788
[45] Date of Patent: May 24, 1994

[54] THRUST REVERSING ARRANGEMENT FOR A LONG DUCT MIXED FLOW EXHAUST TURBOFAN ENGINE

[75] Inventors: Jack D. Wright, Mason; Joe E. Ellis, Cincinnati, both of Ohio

[73] Assignee: General Electric Company, Cincinnati, Ohio

[21] Appl. No.: 38,565

[22] Filed: Mar. 26, 1993

Related U.S. Application Data

[63] Continuation of Ser. No. 741,368, Aug. 7, 1991, abandoned.

[51] Int. Cl.[5] .............................................. F02K 3/02
[52] U.S. Cl. ................................ 60/226.2; 60/230; 244/110 B; 239/265.29
[58] Field of Search .................... 60/226.2, 230; 244/110 B; 239/265.29

[56] References Cited

U.S. PATENT DOCUMENTS

| | | | |
|---|---|---|---|
| 3,262,271 | 7/1966 | Beavers | 60/226.2 |
| 3,500,645 | 3/1970 | Hom | 60/226.2 |
| 3,541,794 | 11/1970 | Johnston et al. | 60/226.2 |
| 3,599,432 | 8/1971 | Ellis | 60/226 |
| 3,603,090 | 9/1971 | MacNamara et al. | 60/226 |
| 3,988,889 | 11/1976 | Chamay et al. | 60/226.2 |
| 4,278,220 | 7/1981 | Johnston et al. | 60/226.2 |
| 4,564,160 | 1/1986 | Vermilye | 244/110 B |
| 4,716,724 | 1/1988 | Newton | 239/265.29 |

*Primary Examiner*—Richard A. Bertsch
*Assistant Examiner*—Michael I. Kocharov
*Attorney, Agent, or Firm*—Jerome C. Squillaro; John R. Rafter

[57] ABSTRACT

A thrust reverser for a long duct mixed flow fan jet engine having a nacelle formed by a fixed forward structure surrounding the fan, a rear fixed structure and a translatable inner and outer cowl therebetween, the nacelle surrounds the engine and forms a long by-pass duct therewith, a common actuator fixed to the translatable cowls to simultaneously displace them over the rear structure, blocker doors coupled to the inner translating cowls for deployment during thrust reversal into the by-pass duct into a blocking position to divert the airflow through the cascades placed into an opening uncovered when the translatable cowls are axially displaced.

12 Claims, 4 Drawing Sheets

THRUST REVERSING ARRANGEMENT FOR A LONG DUCT MIXED FLOW EXHAUST TURBOFAN ENGINE

This application is a continuation of application Ser. No. 07/641,368, filed Aug. 7, 1991, now abandoned.

FIELD OF THE INVENTION

The present invention relates generally to thrust reverser assemblies for aircraft gas turbine fan engines and, more particularly, it relates to a thrust reversing arrangement for a long duct mixed exhaust flow fan engine.

BACKGROUND OF THE INVENTION

Conventional thrust reversers for aircraft gas turbine engines are provided for deflecting the by-pass airflow or exhaust gases or the combination of both in a generally forward direction upon landing of the aircraft for assisting in braking the aircraft. The thrust reversing arrangement is typically designed to translate from a stowed position, wherein it is aerodynamically blended with a conventional nacelle surrounding the engine, to a deployed position wherein the gas or airflow is turned forwardly as it is blocked and turned by the deployed reversing arrangement. Early thrust reversers were applied to the exhaust gas nozzles and became known as the core thrust reversers. Later with the advent of the turbofan engine, thrust reversers were applied to the bypass duct of the engine and became known as the fan thrust reversers. Such thrust reversers have been in the form of blocking doors which are circumferentially distributed and capable of being selectively pivoted so as to block-off the rearward flow of the by-pass air and turn it outward by the use of the so called cascades which are louvered structures mounted in the cowl upstream of the blocker doors. Of course, simultaneously with the actuation of the blocker doors the outer cowl surface must also be opened so that the reversed airflow could pass to the outside through the cascades.

Such reversing arrangement is disclosed in U.S. Pat. No. 3,541,794 issued Nov. 24, 1970 to Everett A. Johnston, David F. Howard, Hans Bollenbacher and Henry H. Carl and assigned to the assignee of the present application, and is incorporated herein by reference. Such referenced patent, however, discloses a short duct separate flow turbofan engine and its thrust reversing arrangement, which due to its shorter cowling structure requires only the opening of a single cowling structure, which is the combination of an inner and outer bondment into a single translating cowling member.

Another reversing arrangement is disclosed in U.S. Pat. No. 4,278,220 issued Jul. 14, 1981 to Everett A. Johnston and Edward W. Ryan and assigned to the United States of America represented by the Administrator of the National Aeronautics and Space Administration, Washington D.C., and is incorporated herein by reference. Such referenced patent discloses a long duct turbofan engine with an improved thrust reverser having a blocker door with an overhead linkage disposed in the outer nacelle structure. It is, however, provided with a single translating cowl member, and the outer wall of the fan duct is formed solely by the blocker door in stowed position and, as its continuity, by the rear fixed structure.

The problems are, however, different in some long duct mixed flow (LDMF) propulsion system, wherein a relatively long fixed rear structure is present, which prevents the above-noted combination of the inner and outer bondments into a single translating member.

The teachings of these patents are specifically intended to be incorporated herein by reference for enabling one skilled in the art to understand the present invention without the disclosure of extraneous material.

OBJECTS AND SUMMARY OF THE INVENTION

It is, therefore, an object of the present invention to provide an improved thrust reversing arrangement in a long duct mixed flow exhaust fan engine which is simple and light in its structure, consequently resulting in an improved fuel efficiency for the propulsion system of the aircraft.

It is another object of the present invention to provide an improved thrust reversing arrangement in a long duct mixed flow exhaust fan engine wherein a common actuating means is capable of translating simultaneously an inner and an outer moveable cowl member to uncover the cascades and to deploy the blocker door structure.

It is still another object of the present invention to provide an improved thrust reversing arrangement in a long duct mixed flow exhaust fan engine wherein a common actuating means is capable of simultaneously translating an inner and an outer moveable cowl member and a blocker door structure.

Yet another object of the present invention is to provide an improved thrust reversing arrangement in a long duct mixed flow exhaust fan engine wherein in a stowed position of the thrust reversing arrangement the by-pass duct is reliably and substantially sealed to prevent escaping of the airflow through the stowed thrust reversing arrangement.

Accordingly, the present invention in one aspect thereof provides a thrust reversing arrangement in a long duct mixed flow exhaust fan engine which has a simplified and light structure resulting in improved fuel efficiency.

The present invention according to another aspect thereof provides in a long duct mixed flow exhaust fan engine an improved thrust reversing arrangement wherein a common actuating means is capable of simultaneously translating an inner and an outer moveable cowl member to uncover the cascades, deploying a blocker door structure and thereby to pass the reversed airflow to the outside.

The present invention according to still another aspect thereof provides in a long duct mixed flow exhaust fan engine an improved thrust reversing arrangement wherein a common actuating means is capable of simultaneously translating an inner and an outer moveable cowl member and deploying a blocker door structure from their stowed position.

BRIEF DESCRIPTION OF THE DRAWINGS

The present invention will become more readily apparent from the following description of a preferred embodiment thereof shown, by way of example, and illustrated in the accompanying drawings, in which.

MODE(S) FOR CARRYING OUT THE INVENTION

Figure 1:
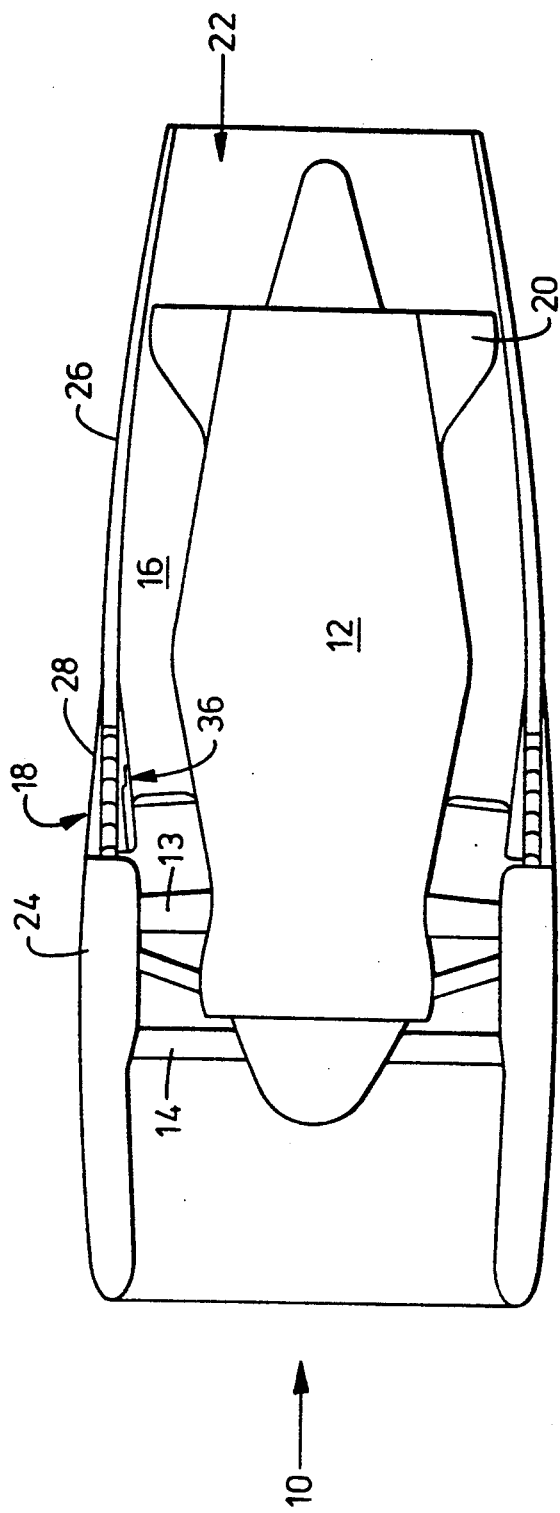
FIG. 1 illustrates in a plan view, partly in section, a long duct mixed flow exhaust fan engine (LDMF) incorporating the present invention.

FIG. 1 illustrates schematically, in a plan view, partly in section, an aircraft engine 10 which is suspended from an aircraft wing (not shown) by a pylon (not shown) in a well known manner. The aircraft engine, as shown, is a long duct mixed flow exhaust fan engine including a centrally disposed core engine 12 which is secured to the pylon by a suitable strut structure 13. The core engine 12 is coupled to drive a fan 14 disposed upstream of the core engine 12. The fan 14 and the core engine 12 are disposed in a nacelle structure 18 which together with the core engine forms an annular by-pass duct 16 for directing a predetermined portion of the airflow from the fan 14 over a mixer device 20 toward the exhaust nozzle 22 for producing the thrust in a well known manner. The nacelle structure 18 includes a fixed forward section 24 forming a casing for the fan 14, a fixed rear structure 26 which at its end portions forms the nozzle 22, and an intermediate translating cowl structure 28 including a blocker door 36. The intermediate translating cowl structure 28 and the blocker door 36 are shown schematically in their stowed position and represent the primary elements of the thrust reversing arrangement. The spatial disposition of the nacelle structure 28 with respect to the core engine 12 should be clear also from the figures of the above-referenced patents.

Figure 2:
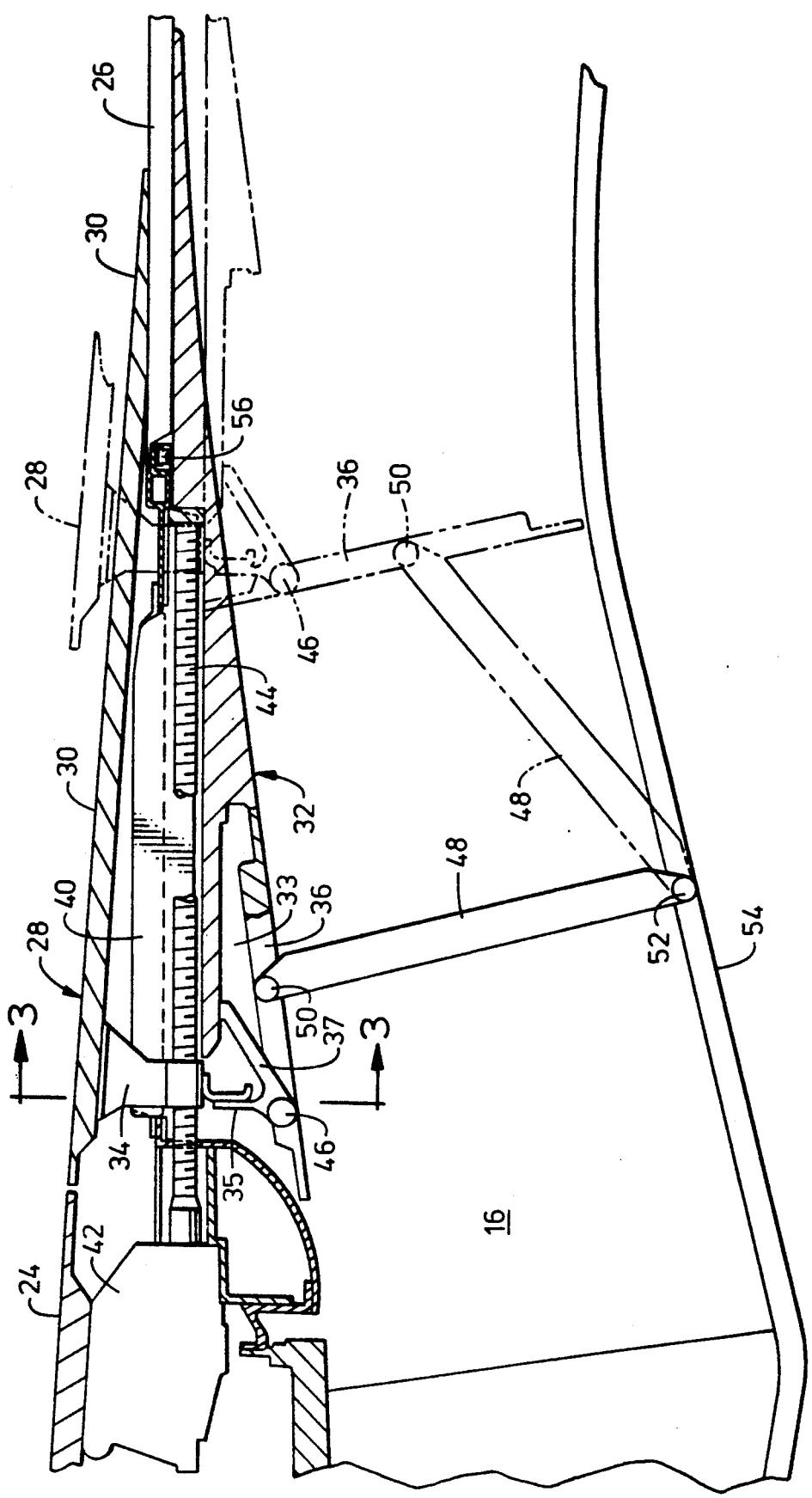
FIG. 2 illustrates in an enlarged cross-sectional view, taken along line 2—2 of FIG. 3 in the area of the reverser, the thrust reversing arrangement according to the present invention being in the stowed position, indicating also the primary elements by broken lines in the deployed or reversed thrust position.
Figure 4:
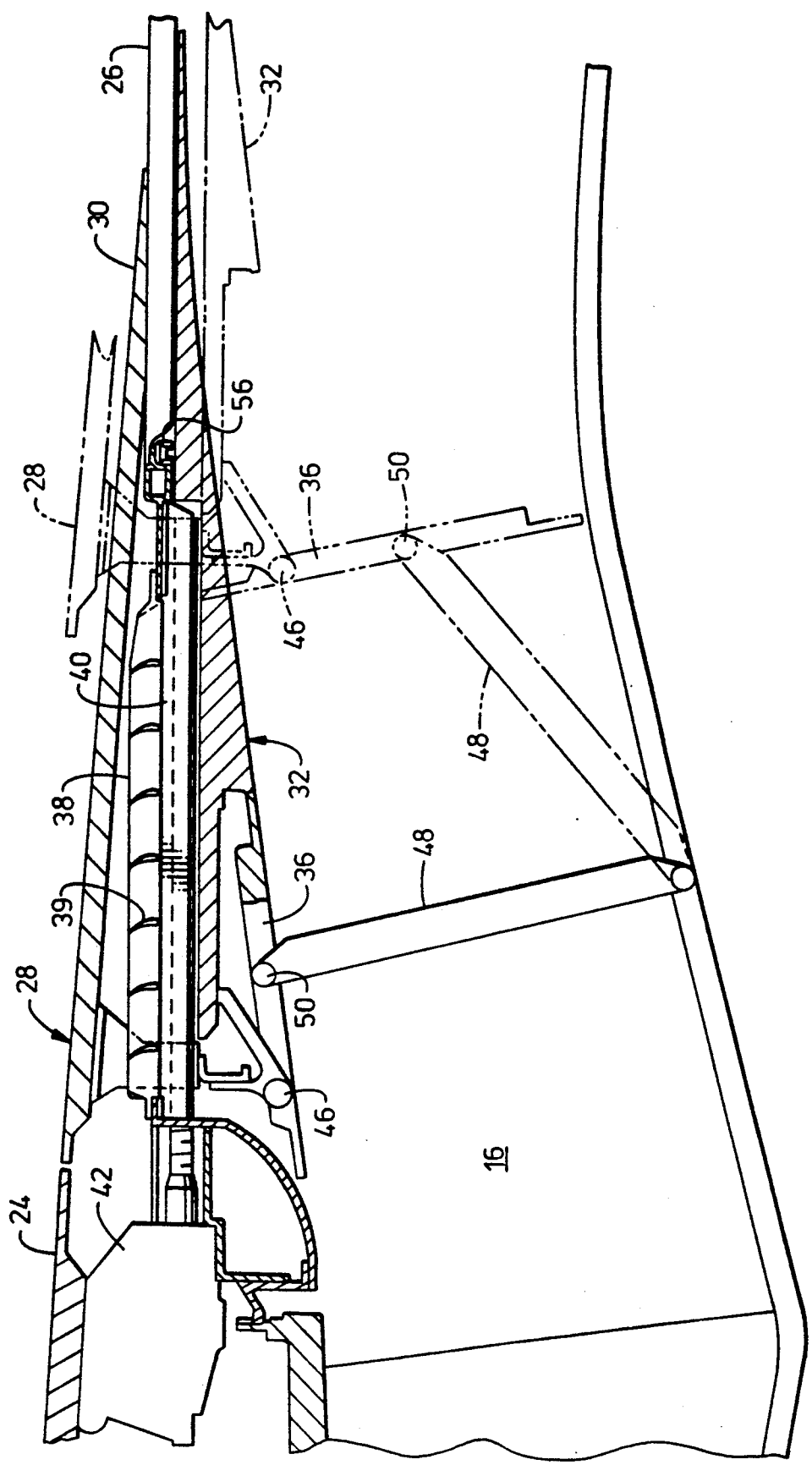
FIG. 4 is a sectional view similar to FIG. 2 taken along line 4—4 of FIG. 3.

Turning now to FIGS. 2 and 4, it is seen that the translating cowl structure 28 shown, in its stowed position, includes an outer translating cowl member 30 and an inner translating cowl member 32. In such stowed position the outer cowl member 30 with its axially frontal end portion lies adjacent the fixed forward structure 24 or fan cowl and with its axially rear end portion rests on the upper or radially outer surface of the rear fixed structure 26. As a result, the outer translating cowl member 30 forms in its stowed position a substantially flow tight, continuous aerodynamic annular surface with the fixed forward structure or fan cowl 24 and with the fixed rear structure 26.

The inner translating cowl member 32 with its axially rear end portion lies against the radially inside surface of the rear fixed portion 26 while with its axially forward portion it is fixedly connected with a tie bracket 34 the function of which will be described in more detail hereinafter. The axially forward end portion of the inner translating cowl member 32 has a recessed region 33 formed therein to accommodate therein the blocker door 36 in its stowed position as shown by the solid lines. Tie bracket 34 is fixedly connected to the outer translating cowl member 30 and to the inner translating cowl member 32 by a coupling arm member having arms 35, 37, which arms in turn pivotally couple the blocker door 36 to the inner translating cowl member 32, as hereinafter described in their operative relationship. In the space formed between the outer translating cowl member 30 and the inner translating cowl member 32 a louvered cascade structure 38 is disposed which is well known in the art to include a large number of vanes 39 connected in a honeycomb fashion. The vanes 39 are directed to force the air flowing therethrough upward and forward during the reversing operation hereinafter described. Also in the space between the outer and inner translating cowl members 30,32 an actuator means 44 of an actuating mechanism generally identified at 42, extends. The actuating mechanism 42 can be electrically, pneumatically or mechanically driven and its actuator means 44 can be formed, for example, as a worm gear, passing through a portion of the tie bracket 34 formed, in that example, as a screw follower mechanism, well known in the art. In the event the actuator means 44 is of a pneumatic-type, then the tie bracket 34 will be fixedly connected to the moving portion of the actuator means 44 for an axial displacement therewith. The blocker door 36 is pivotally coupled by the pivot member 46 to the inner translating cowl member 32 by arm 37. The blocker door 36 is also coupled by a link member 48 through a fixed pivot 50 in the door 36 to the inner wall 54 of the by-pass duct 16 at a fixed pivot 52. As can be seen in FIG. 2, the blocker door 36 and the inner translating cowl member 32 in their stowed position form a substantially flow tight continuous aerodynamic surface which serves as the outer wall of the by-pass duct 16.

When reversing operation is desired, the actuator mechanism 42, mounted in the fan cowl or forward fixed structure 24, is set into operation and causes an operation of its actuator means 44 which in turn will cause an axial displacement of the tie bracket 34. Due to the above-described operating connection of the outer and inner translating cowl members 30,32 and of the blocker door 36 with the tie bracket 34, a displacement of the outer and inner translating cowl members 30,32 will take place over the rear fixed structure 26 to a position shown by the broken lines. As can be seen in the drawings, the rear fixed structure 26 has a lesser downstream diameter than its upstream diameter on its radially outer surface and, conversely, a lesser downstream diameter than its upstream diameter on its radially inner surface, which fact facilitates the axial displacement of the outer and inner translating cowl members 30, 32 over such outer and inner surfaces. The blocker door 36 will become unhinged from its stowed position and pivoted into its deployed position as shown by the broken lines and held in it by the link member 48.

Figure 3:
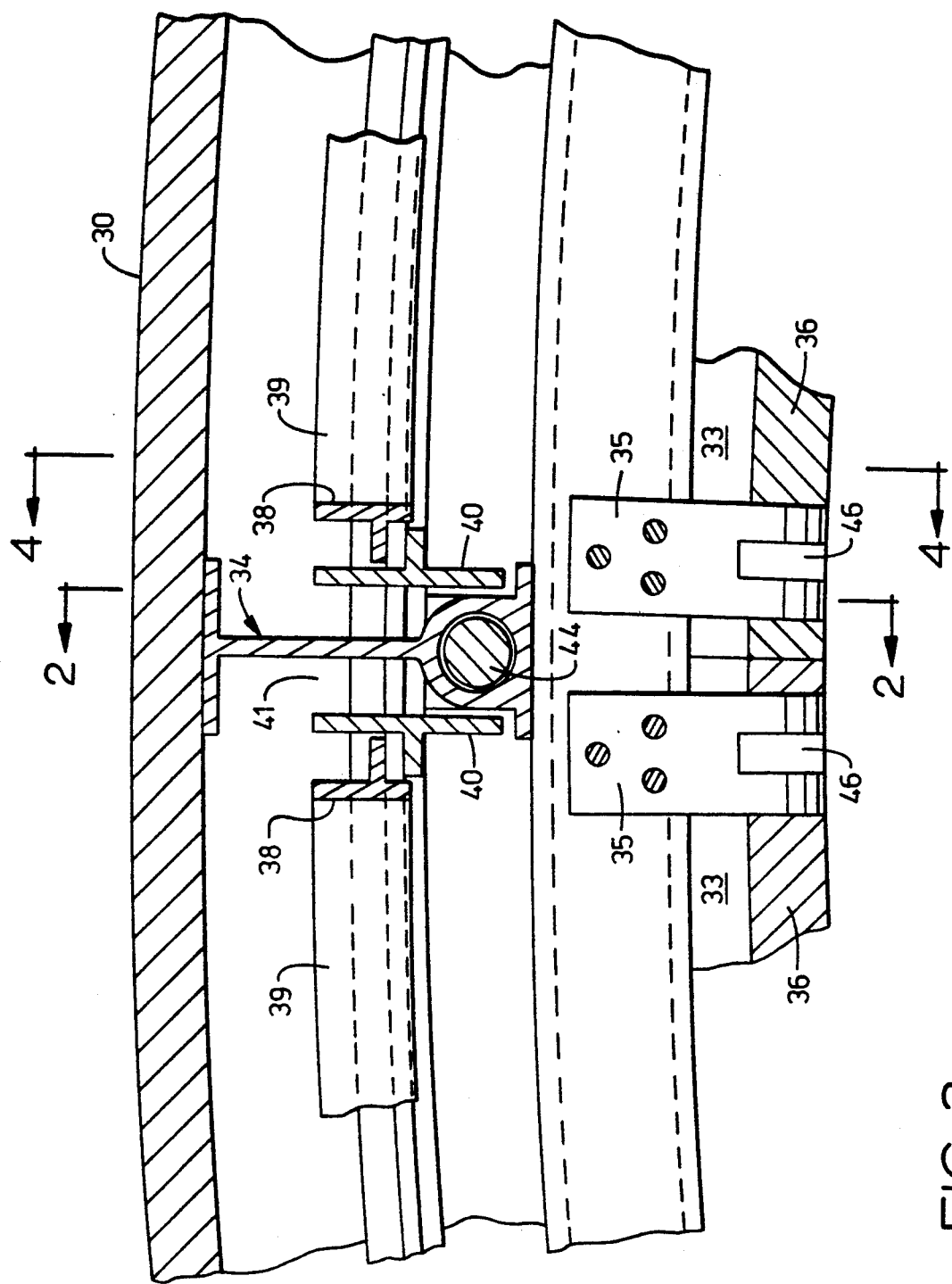
FIG. 3 is a broken-out enlarged partial sectional view taken along line 3—3 of FIG. 2.

It is noted that the cascades 38 are stationary and are supported against hoop loads by beams indicated in FIGS. 2–4 at 40. The cascades 38 have an axial slot 41 formed in them for permitting the axial displacement of the tie bracket 34.

In order to facilitate the afore-mentioned flow tight conditions in the by-pass duct 16 during non-thrust reversing operation, an inflatable seal 56 is provided between a lip portion of the rear fixed structure 26 and is the radially outer surface of the inner translating cowl member 32. During normal or forward thrust operation the seal 56 is inflated and, when thrust reversal is commenced, it is deflated, in order to allow for a friction-free axial sliding of the inner translating cowl member 32 over it.

As can be readily appreciated from the above description of the operating connections and of the operation itself, during thrust reversal, the airflow is reliably blocked by the blocker door 36 and it is diverted through the opening created by the displacement of the outer and inner translating cowl members 30,32 and turned upward and forward by the cascade vanes 39. A considerable savings in weight has been accomplished by providing a common bracket 34 and actuator means 44 for the cowl members 30,32.

It is noted and, as can be seen by the showing of the above-referenced patents, the reversing arrangement is split into two halves, which are hingedly connected and can be opened for access to the core engine. Preferably, each half contains a predetermined number of blocker doors and their associated linkages and a common actuating mechanism for each half.

While there has been described herein what is considered to be a preferred embodiment of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the appended claims.

What is claimed is:

1. In a high by-pass fan jet propulsion power plant of the type including a core engine, said by-pass fan, and a long duct nacelle structure formed by a forward fixed cowl structure surrounding a forward portion of said fan, an intermediate translatable cowl member surrounding an aft portion of said fan and a rear fixed cowl structure surrounding the remainder of said core engine, said long duct nacelle structure surrounding the entire length of said core engine for forming a long by-pass duct therewith, and creating a mixed exhaust flow for the by-pass air and the core engine exhaust gasses, a thrust reversing arrangement for reversing the fan flow in said by-pass duct, comprising:

said intermediate translatable cowl member including an inner and outer translatable cowl members axially mounted between said forward and rear fixed cowl structures;

blocking door means, a dual arm means pivotally coupling an intermediate portion of said blocking door means to said inner and outer translatable cowl members, said dual arm means being fixedly connected to said inner and outer translatable cowl members, for pivotally deploying said blocking door means in a continuously controlled manner into said by-pass duct during thrust reversal for blocking the air flow in said by-pass duct and diverting said air flow through an opening created by the translation of inner and outer translatable cowl members to the outside of said long duct nacelle structure during thrust reversal;

means for pivotally coupling said blocking door means to radially inner wall of said by-pass duct and retaining said blocking door means in aid deployed position during said thrust reversing operation, a single actuating mechanism fixedly coupled to said inner and outer translating cowl members and said dual arm means for simultaneously and axially moving said inner and outer cowl members over said rear fixed cowl structure into a deployed position of said inner and outer translating cowl members and driving said blocker door means in a continuously controlled manner for pivotally deploying said blocker door means in said fan duct to its deployed position against and substantially perpendicular to the inner wall of said by-pass fan duct, and a common operating means comprising said dual arm means and said common operating means being fixedly coupled to a tie bracket means and said inner translatable cowl member for axially translating said inner and outer cowl members over a portion of said rear fixed cowl structure and uncovering thereby said opening to the outside of said long duct nacelle structure wherein said dual arm means is directly connected to said inner translatable cowl member and is indirectly connected to said outer translatable cowl member.

2. The thrust reversing arrangement according to claim 1, forming a continuous radially outer surface for said nacelle structure and a continuous radially outer surface for said by-pass duct in a stowed position of said thrust reversing arrangement.

3. The thrust reversing arrangement according to claim 1, wherein said forward fixed structure, said outer translatable cowl member and said rear fixed structure form a continuous radially outer surface for said nacelle structure prior to the axial translation of said outer translatable cowl member.

4. The thrust reversing arrangement according to claim 1, wherein said forward fixed structure, said inner translatable cowl member and said rear fixed structure form a continuous radially outer surface for said by-pass duct prior to the axial translation of said inner translatable cowl member.

5. The thrust reversing arrangement according to claim 4, wherein said inner translatable cowl member has a recessed portion formed therein for receiving said blocking door means therein in a stowed position of said blocking door means and forming said continuous radially outer surface for the by-pass duct therewith.

6. The thrust reversing arrangement according to claim 1, wherein said inner and outer translatable cowl members from a space therebetween, wherein a louvered cascade means substantially occupies said space.

7. The thrust reversing arrangement according to claim 6, wherein said cascade means is fixedly attached to said forward and rear cowl structures and includes a plurality of vane means directed upstream for imparting a forward flow to the air flow form said by-pass duct when said blocking door means is in said deployed position thereof.

8. The thrust reversing arrangement according to claim 1, including said single actuating mechanism for said thrust reversing arrangement, means for mounting said actuating mechanism in said forward fixed structure, and means for operatively coupling said actuating mechanism to said common operating means.

9. The thrust reversing arrangement according to claim 8, wherein said common operating means comprises:

said tie bracket means fixedly coupling said outer translatable cowl member to said dual arm means, thereby fixedly connecting said inner translatable cowl member to said outer translatable cowl member, and a means for axially displacing said tie bracket means when said actuating mechanism is operated.

10. The thrust reversing arrangement according to claim 1, including an inflatable seal means mounted between a radially outer surface of said inner translating cowl member and a radially inner surface of said rear fixed structure for preventing escape of the airflow from said by-pass duct during the stowed position of said thrust reversing arrangement.

11. An improved long duct mixed exhaust flow engine thrust reverse comprising:
- a translatable intermediate cowl structure including an outer and an inner translating cowl member forming a radial space therebetween;
- a forward and rear fixed cowl structure;
- means for mounting said intermediate cowl structure axially between said forward and said rear fixed cowl structure in a stowed position thereof and forming a by-pass duct surrounding the entirety of said long duct mixed flow engine;
- a blocker means;
- a dual arm means for pivotally and directly mounting an intermediate portion of said blocker means in axial alignment with said inner cowl member when in a stowed position thereof, said dual arm means being fixedly coupled to said inner and outer translatable cowl members;
- a single actuating mechanism fixedly coupled to said outer and inner translating cowl members for axially moving said inner and outer cowl members simultaneously over said rear fixed cowl structure into a deployed position of said inner and outer translating cowl members, said pivotally mounting dual arm means coupling an intermediate portion of said blocker means to said inner and outer translating cowl members and being axially moved therewith in a continuously controlled manner, said blocker means thereby being moved into a deployed position in and substantially perpendicular to said by-pass duct for blocking the fan flow and diverting it to the outside through an opening uncovered by said outer and inner translating cowl members in their deployed position; and
- a louvered cascade means, including a means for fixedly mounting said cascade means to said forward fixed cowl structure and rear fixed cowl structure, said cascade means imparting an outward and axially forward flow to the blocked fan flow wherein said dual arm means is directly connected to said inner translatable cowl member and is indirectly connected to said outer translatable cowl member.

12. The thrust reverser according to claim 11, wherein a pivotable linking arm means is provided for coupling said blocker means to a radially inner wall of said fan duct and retaining said blocker means in the deployed position during thrust reversing.

* * * * *